(12) United States Patent
Guo et al.

(10) Patent No.: US 11,658,310 B2
(45) Date of Patent: May 23, 2023

(54) HIGH-PERFORMANCE CATHODE CATALYST FOR METAL-AIR BATTERY AND PREPARATION METHOD THEREOF

(71) Applicant: JIANGSU UNIVERSITY OF SCIENCE AND TECHNOLOGY, Jiangsu (CN)

(72) Inventors: Xingmei Guo, Jiangsu (CN); Junhao Zhang, Jiangsu (CN); Wei Zhang, Jiangsu (CN); Xiaohan Wan, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 17/638,188

(22) PCT Filed: Jul. 6, 2021

(86) PCT No.: PCT/CN2021/104742
§ 371 (c)(1),
(2) Date: Feb. 25, 2022

(87) PCT Pub. No.: WO2022/095492
PCT Pub. Date: May 12, 2022

(65) Prior Publication Data
US 2022/0352526 A1    Nov. 3, 2022

(30) Foreign Application Priority Data

Nov. 4, 2020   (CN) .......................... 202011215077.2

(51) Int. Cl.
| | | |
|---|---|---|
| *H01M 4/90* | (2006.01) | |
| *H01M 4/88* | (2006.01) | |
| *H01M 12/08* | (2006.01) | |
| *H01M 4/86* | (2006.01) | |

(52) U.S. Cl.
CPC ....... *H01M 4/9083* (2013.01); *H01M 4/8817* (2013.01); *H01M 4/8846* (2013.01); *H01M 4/9016* (2013.01); *H01M 12/08* (2013.01); *H01M 2004/8689* (2013.01)

(58) Field of Classification Search
CPC ... B01J 21/18; B01J 23/70; B01J 23/72; B01J 23/75; B01J 23/755; B01J 27/24; B01J 37/0207; B01J 37/08; B01J 35/0033; B01J 35/023; H01M 4/9083; H01M 4/8817; H01M 4/8846; H01M 4/9016; H01M 12/08; H01M 2004/8689
USPC ........ 502/184, 185, 200, 331, 337, 338, 345
See application file for complete search history.

(56) References Cited

U.S. PATENT DOCUMENTS

| | | | | |
|---|---|---|---|---|
| 2010/0266907 | A1 | 10/2010 | Yazami | |
| 2019/0333708 | A1* | 10/2019 | Tsumeda | ................ H01G 11/86 |
| 2022/0037675 | A1* | 2/2022 | Cai | ..................... H01M 4/8882 |

FOREIGN PATENT DOCUMENTS

| | | | | |
|---|---|---|---|---|
| CA | 2565113 A1 | * 12/2005 | ............. B01J 23/42 |
| CN | 102683726 | 9/2012 | |
| CN | 106602092 | 4/2017 | |
| CN | 109786769 | 5/2019 | |
| CN | 110492112 | 11/2019 | |
| CN | 112002561 A | * 11/2020 | ............ H01G 11/48 |
| CN | 112382769 | 2/2021 | |
| JP | 2013-080922 | * 5/2013 | ............... H01F 1/06 |

OTHER PUBLICATIONS

"International Search Report (Form PCT/ISA/210) of PCT/CN2021/104742," dated Aug. 27, 2021, pp. 1-4.
"Written Opinion of the International Searching Authority (Form PCT/ISA/237) of PCT/CN2021/104742," dated Aug. 27, 2021, with English translation thereof, pp. 1-8.

* cited by examiner

*Primary Examiner* — Patricia L. Hailey
(74) *Attorney, Agent, or Firm* — JCIPRNET

(57) ABSTRACT

A high-performance positive electrode catalyst for a metal-air battery is disclosed, which is composed of transition metal nitride-transition metal oxide heterogeneous particles and a mesoporous carbon matrix. The nano heterogeneous particles, which are 10-50% based on the total mass of the catalyst, are dispersed in the mesoporous carbon matrix; and the oxide is 10-100% based on the heterogeneous particles. A preparation method of the catalyst includes: treating mesoporous carbon with a strong acid solution to obtain surface-functionalized mesoporous carbon; immersing the surface-functionalized mesoporous carbon in an aqueous solution of a transition metal salt, and stirring and washing; adding ammonia water and stirring to enable a confined complexation reaction; washing again, and vacuum drying; and calcining the product in an inert atmosphere or a vacuum condition.

9 Claims, 16 Drawing Sheets

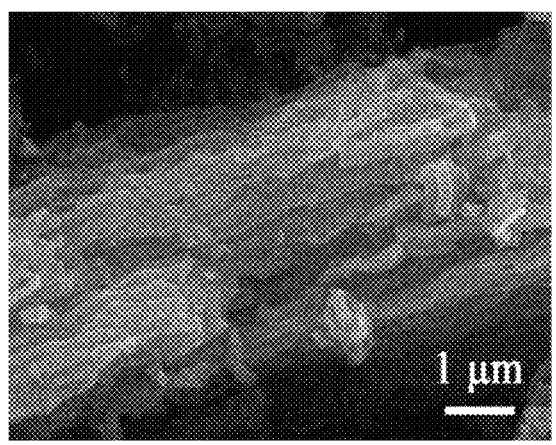 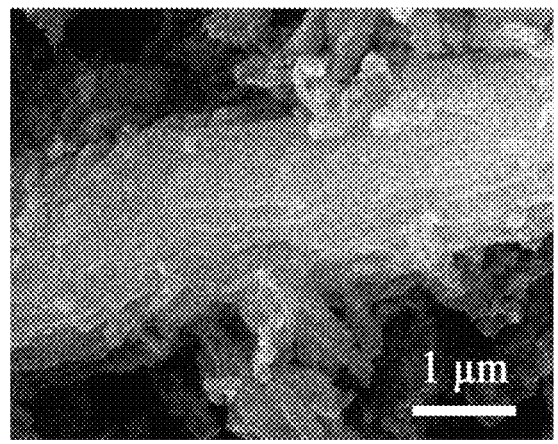
FIG. 1a    FIG. 1b
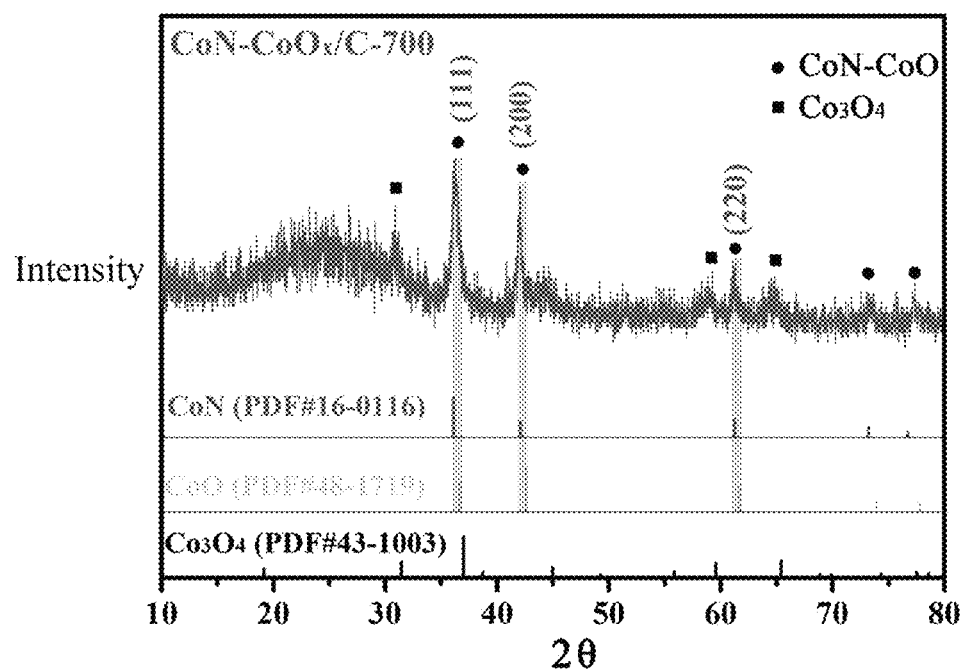
FIG. 2

HIGH-PERFORMANCE CATHODE CATALYST FOR METAL-AIR BATTERY AND PREPARATION METHOD THEREOF

CROSS-REFERENCE TO RELATED APPLICATION

This application is a 371 of international application of PCT application serial no. PCT/CN2021/104742, filed on Jul. 6, 2021, which claims the priority benefit of China application no. 202011215077.2, filed on Nov. 4, 2020. The entirety of each of the above mentioned patent applications is hereby incorporated by reference herein and made a part of this specification.

TECHNICAL FIELD

The present disclosure relates to the technical field of electrocatalytic materials, and more particularly relates to a high-performance cathode catalyst for a metal-air battery and a preparation method thereof.

RELATED ART

Oxygen reduction reaction (ORR), as a cathode reaction of a metal-air battery, has a slow dynamic process that greatly restricts the energy conversion efficiency of the battery. The research and development of a high-performance electrocatalyst to reduce the reaction energy barrier and overpotential of the ORR has become a research hotspot in this field. At present, the Pt-based materials having the highest catalytic activity have the shortcomings of high price and low stability, thus limiting the large-scale popularization of relevant devices. Therefore, it is a pressing task to research and develop a non-noble metal ORR electrocatalyst having low cost, high activity and high stability, so as to promote the commercialization of metal-air batteries.

Thanks to the multiple oxidation states of transition metal elements, many transition metal compounds such as oxides, nitrides, sulfides and phosphides exhibit excellent electrocatalytic activity. Due to a shortcoming of poor conductivity, the transition metal compounds need to be combined with a conductive carbon matrix, and are used as electrocatalysts in a form of carbon-based metal compounds. However, in a continuous catalytic process, the compounds can easily fall off from the matrix or agglomerate, thus influencing electron transport and reducing catalytic activity and stability. Therefore, the difficulty in the study of the carbon-based metal compound electrocatalysts is how to disperse the compound firmly and uniformly on the carbon matrix in a form of fine crystal grains.

In addition, most of current works can only acquire single-component transition metal compound particles; and to prepare heterogeneous particles comprising two compound crystals and achieve regulation and control on the evolution process of heterogeneous components is of great significance for optimizing the function and activity of the electrocatalysts.

SUMMARY OF INVENTION

A first objective of the present disclosure is to provide a high-performance cathode catalyst for a metal-air battery. The specific technical solution is as follows.

A high-performance cathode catalyst for a metal-air battery, wherein the catalyst is composed of transition metal nitride-transition metal oxide heterogeneous particles ($MN_x$-$MO_y$) and a mesoporous-structure carbon matrix (C); the heterogeneous particles are dispersed in the mesoporous-structure carbon matrix in a form of nanoparticles; the heterogeneous particles have a size of 20-80 nm, and are 10-50% based on the total mass of the catalyst; the heterogeneous particles consist of a nitride and an oxide of a transition metal, wherein the oxide is 10-100% based on the total mass of the heterogeneous particles.

In an embodiment, the transition metal is Co, Ni or Cu.

A second objective of the present disclosure is to provide a preparation method of the high-performance cathode catalyst for a metal-air battery. The specific technical solution is as follows.

The preparation method of the high-performance cathode catalyst for a metal-air battery, comprising the following steps:

(1) Mesoporous carbon is processed by surface functionalization:

the mesoporous carbon is dispersed in a strong acid solution, and stirred for 0.5-2 h so that the strong acid solution is fully immersed in a mesoporous structure of the mesoporous carbon to obtain a dispersion; the dispersion is put into a reaction kettle, held at 100-200° C. for 2-6 h (an oxidized functional group is formed on the carbon surface under the effect of the strong acid), and naturally cooled to room temperature; the mesoporous carbon treated with the strong acid solution is centrifugally separated out and centrifugally washed using water and ethanol to obtain a resulting product; and the resulting product is dried in vacuum to obtain surface-functionalized mesoporous carbon; and (2) co-adsorption of transition metal ions $M^{n+}$ and transition metal ammonia complex ions $M(NH_3)_m^{n+}$ on the mesoporous carbon, wherein the surface-functionalized mesoporous carbon obtained in step (1) is immersed in an aqueous solution of a transition metal (M) salt having a concentration of 1-10 mmol $L^{-1}$, and stirred for 0.5-4 h so that the transition metal ions $M^{n+}$ are adsorbed on the mesoporous carbon; the mesoporous carbon adsorbing the transition metal ions $M^{n+}$ is centrifugally washed using water, and then dispersed in water again; after that, ammonia water having a concentration of 25%-28% is added, and stirred for 0.5-2 h so that some of the transition metal ions $M^{n+}$ adsorbed on the mesoporous carbon contact with the ammonia water and react to generate transition metal ammonia complex ions $M(NH_3)_m^{n+}$, where the large size of the transition metal ammonia complex ions impedes further reaction between the ammonia water and other transition metal ions in the mesopores, so that the transition metal ions cannot be totally converted into transition metal ammonia complex ions, thus realizing co-adsorption of the transition metal ions $M^{n+}$ and the transition metal ammonia complex ions $M(NH_3)_m^{n+}$ on the mesoporous carbon; then the mesoporous carbon contacted the ammonia water is centrifugally washed using water and ethanol respectively to obtain a resulting product; and the resulting product is dried in vacuum to obtain mesoporous carbon with $M^{n+}$ and $M(NH_3)_m^{n+}$ adsorbed thereon, namely, $M(NH_3)_m^{n+}$ & $M^{n+}$/C;

(3) heat treatment on the mesoporous carbon with a large amount of $M^{n+}$ and $M(NH_3)_m^{n+}$ adsorbed thereon to obtain a $MN_x$-$MO_y$/C composite, wherein the $M(NH_3)_m^{n+}$ & $M^{n+}$/C obtained in step (2) is calcined in an inert atmosphere or a vacuum condition, where the functional groups and the ligands are pyrolyzed and volatilized at high temperature, so that the $M(NH_3)_m^{n+}$ &$M^{n+}$/C is converted into $MN_x$-$MO_y$ heterogeneous particles, to obtain a composite having transition metal nitride-transition metal oxide heterogeneous particles highly dispersed in the mesoporous carbon matrix, namely, $MN_x$-$MO_y$/C.

In an embodiment, in step (1), the strong acid solution is a 0.5-2 mol $L^{-1}$ nitric acid solution.

In an embodiment, in steps (1) and (2), the temperature of the vacuum drying is 40-90° C., and the time is 6-24 h.

In an embodiment, in step (2), the transition metal salt is a chloride or nitrate of a transition metal.

In an embodiment, in step (3), the calcining method is: increasing the room temperature to 600-800° C. at a rate of 0.5-10° C./min, holding the temperature for 1-4 h, and naturally cooling to the room temperature.

In an embodiment, in step (3), the inert atmosphere is $N_2$ atmosphere.

In an embodiment, in step (1), the concentration of the mesoporous carbon in the aqueous solution of nitric acid is 3-10 mg/mL; and in step (2), a dosage ratio of the surface-functionalized mesoporous carbon, the aqueous solution of the transition metal salt and the ammonia water is 1-10 mg:1-5 mL:1 mL.

The present disclosure has the following beneficial effects.

Through lots of creative experiments, the inventors obtain mesoporous carbon having a large amount of transition metal ammonia complex ions and transition metal ions co-adsorbed thereon by using a confinement effect of nanoscale pore channels in mesoporous carbon on the ion transport and complex reaction, and through further calcination, obtain mesoporous carbon having dispersed transition metal nitride-transition oxide heterogeneous particles; and the relative contents of the nitride and the oxide can be regulated by controlling the calcination temperature.

The $MN_x$-$MO_y$/C composite obtained by the present disclosure, as an electrocatalyst for oxygen reduction reactions, has an activity close to the commercially available 20 wt % Pt/C electrocatalysts and a durability better than the commercial Pt/C electrocatalysts. The metal-air batteries assembled by using the composite as a cathode electrocatalyst are equivalent to the batteries assembled by using commercial Pt/C as a catalyst in terms of energy density, power density, stability and the like. Moreover, the preparation method is simple, efficient and controllable and is suitable for industrial production.

BRIEF DESCRIPTION OF DRAWINGS

To make clearer the purposes, technical solutions and technical effects of the present disclosure, the present disclosure is described with the following accompanying drawings:

FIG. 1a and FIG. 1B are a field emission scanning electron micrograph of mesoporous carbon C (FIG. 1a) and CoN—$CoO_x$/C-700 (FIG. 1B) in example 1.

FIG. 2 is the XRD spectrum of CoN—$CoO_x$/C-700 in example 1.

DESCRIPTION OF EMBODIMENTS

For better understanding of the essence of the present disclosure, the present disclosure is further described below with reference to examples.

Note: the CoN relationship is already determined, and there is only one unknown parameter for the composites in the examples 1-4 below. Therefore, for convenience, the unknown parameter is set as x, namely, CoN—$CoO_x$/C (equivalent to CoN—$CoO_y$/C).

Example 1

Preparation of a CoN—$CoO_x$/C Composite
(1) Mesoporous carbon is processed by surface functionalization: 80 mg of mesoporous carbon (CMK-3) was dispersed in 15 mL of a 1 mol $L^{-1}$ aqueous solution of nitric acid, and stirred for 1 h at room temperature; the dispersion was transferred into a 25 mL reaction kettle having a Teflon lining, and held at 150° C. for 4 h; the dispersion was cooled to room temperature, and then the kettle was opened; the sample of mesoporous carbon was centrifugally separated out and centrifugally washed three times using deionized water and absolute ethanol respectively; and finally, the sample was dried in vacuum for 12 h at 60° C., to obtain surface-functionalized mesoporous carbon.

(2) Co-adsorption of metal ions $Co^{2+}$ and metal ammonia complex ions $Co(NH_3)_6^{2+}$ on the mesoporous carbon: first, 50 mg of the surface-functionalized mesoporous carbon was soaked in 20 mL of a 3 mmol $L^{-1}$ $CoCl_2$ aqueous solution, and stirred for 1 h at room temperature; the thus-treated mesoporous carbon was centrifugally washed using deionized water, and then dispersed again in 30 mL of deionized water; after that, 10 mL of ammonia water (25%-28%) was added, and stirred for 1 h at room temperature; the treated mesoporous carbon was centrifugally washed three times using deionized water and absolute ethanol respectively; and finally, the sample was dried in vacuum for 12 h at 60° C., to obtain a $Co(NH_3)_6^{2+}$&$Co^{2+}$/C sample.

(3) Heat treatment to obtain a CoN—$CoO_x$/C composite: the $Co(NH_3)_6^{2+}$&$Co^{2+}$/C sample was heated from room temperature to 700° C. at a heating rate of 1° C. $min^{-1}$ in $N_2$ atmosphere, and was held at the temperature for 1 h, to obtain a sample of high-performance cathode catalyst for a metal-air battery, marked as CoN—$CoO_x$/C-700.

FIG. 1a and FIG. 1b respectively shows the SEM images of the mesoporous carbon and CoN—$CoO_x$/C-700 of this example, which show that the morphology of the mesoporous carbon is not damaged by the calcination at 700° C.

FIG. 2 is the XRD spectrum of the CoN—$CoO_x$/C-700 obtained from this example, which shows that the main components of the compound dispersed on the carbon matrix are CoN, CoO and $Co_3O_4$.

Figure 3A:
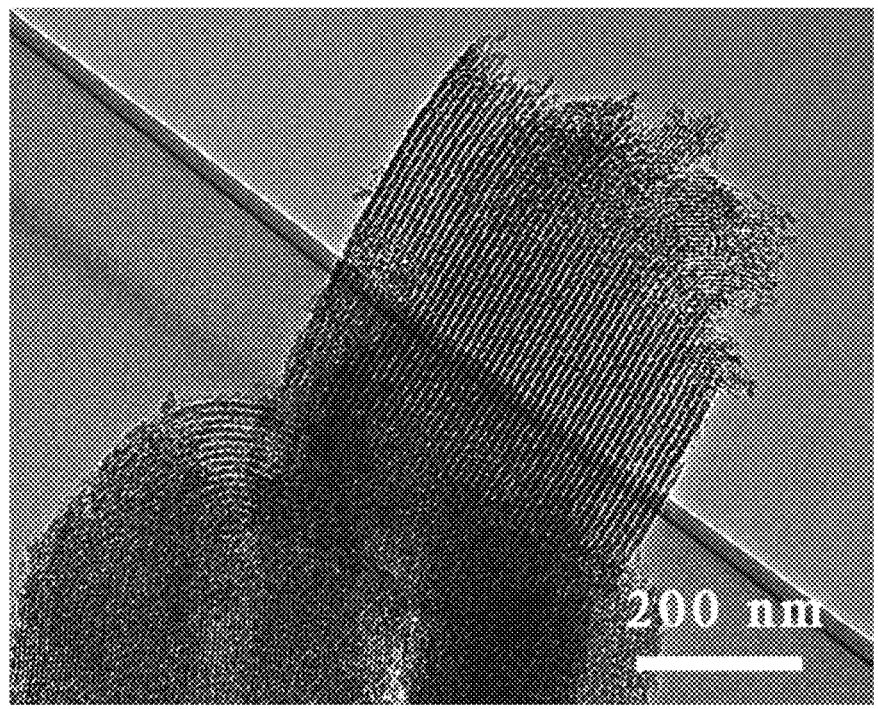
FIG. 3a, FIG. 3b, FIG. 3c, FIG. 3d, and FIG. 3e show a transmission electron micrograph (FIG. 3a) of mesoporous carbon C in example 1 as well as a transmission electron micrograph (FIG. 3b), a high-resolution lattice diagram (FIG. 3b), a selected area electron diffraction diagram (FIG. 3c), a selected area electron diffraction diagram (FIG. 3d) and an element distribution diagram (FIG. 3e) of the prepared CoN—$CoO_x$/C-700.
Figure 3B:
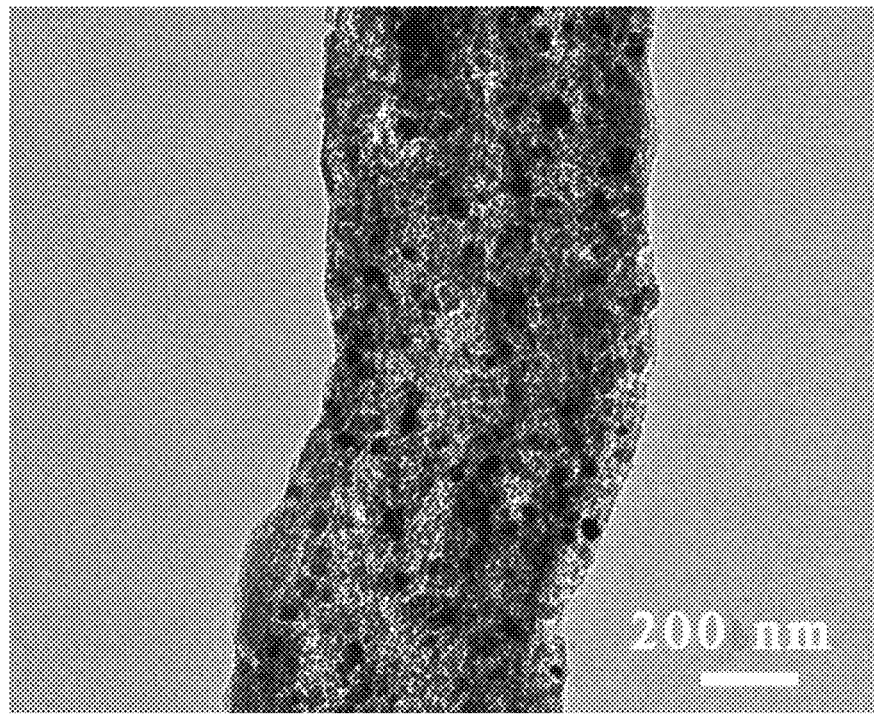
Figure 3C:
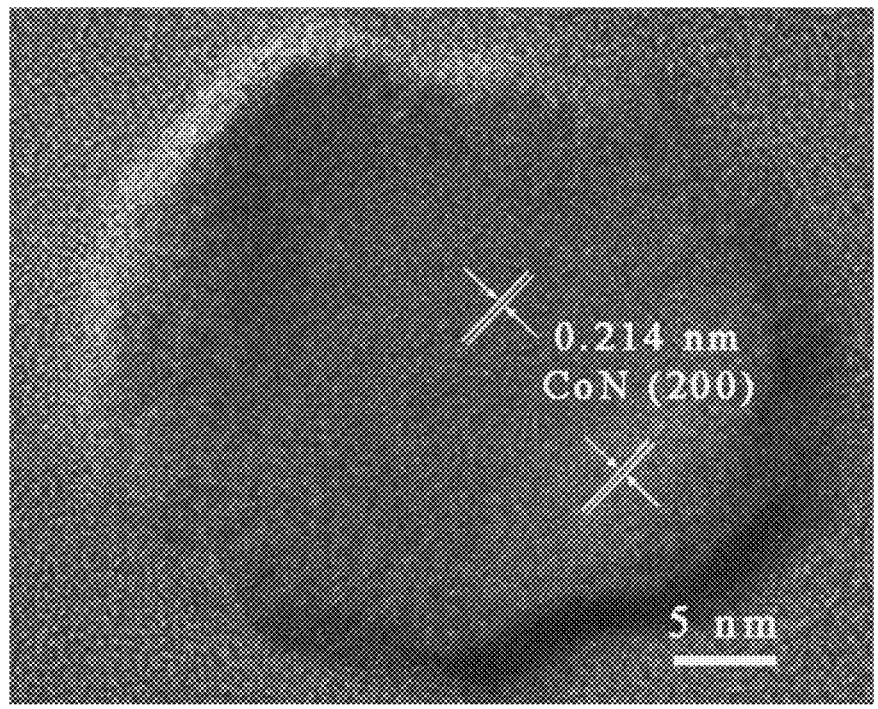
Figure 3D:
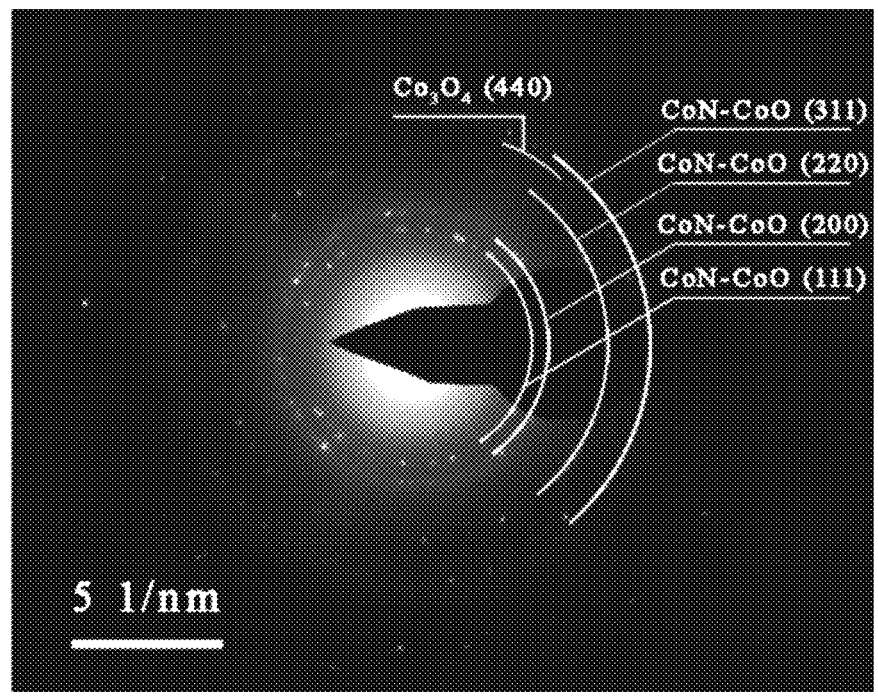
Figure 3E:
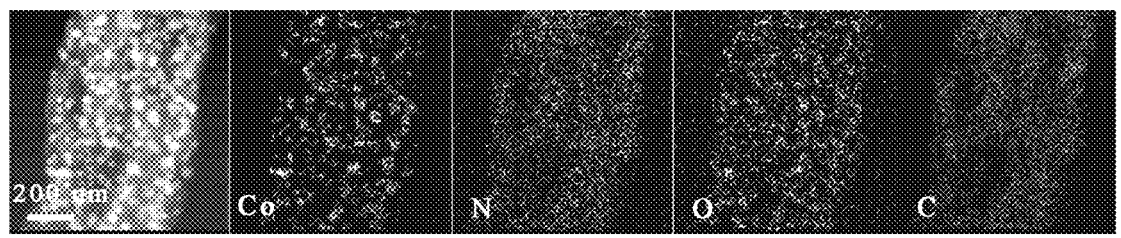

FIG. 3a is the TEM image of original mesoporous carbon, clearly showing mesopores in one-dimensional orderly arrangement. FIG. 3b is the TEM image of CoN—$CoO_x$/C-700, which shows that the mesoporous carbon is still kept in original configuration, except that a large number of compound particles are uniformly dispersed inside, and the feature of orderly arrangement of the mesopores disappears. From the lattice image of FIG. 3c and the selected area electron diffraction result of FIG. 3d, the main components of the compound particles are CoN—CoO and $Co_3O_4$, which is consistent with the XRD result. The element distribution diagram shown in FIG. 3e proves the uniform distribution of the elements Co, N, O and C.

Figure 4A:
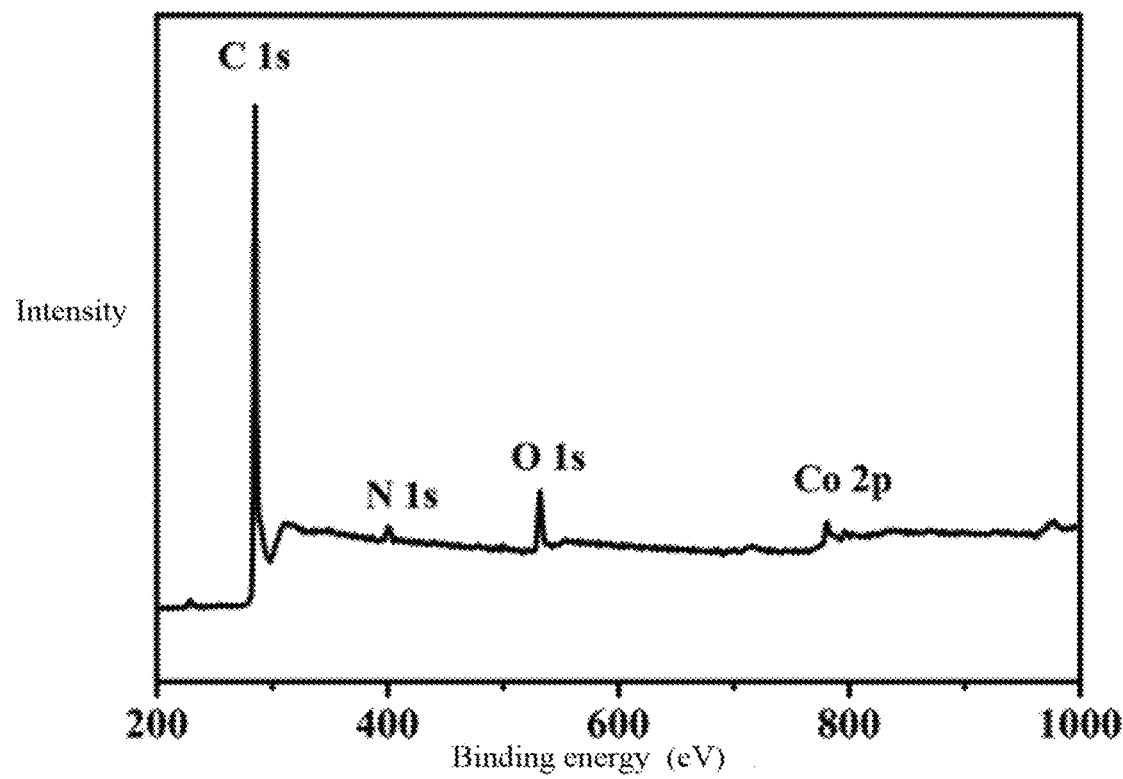
FIG. 4a, FIG. 4b, FIG. 4c, and FIG. 4d show the XPS full spectrum (FIG. 4a), Co 2p high-resolution spectrum (FIG. 4b), N 1s high-resolution spectrum (FIG. 4c) and O 1s high-resolution spectrum (FIG. 4d) of CoN—$CoO_x$/C-700 in example 1.
Figure 4B:
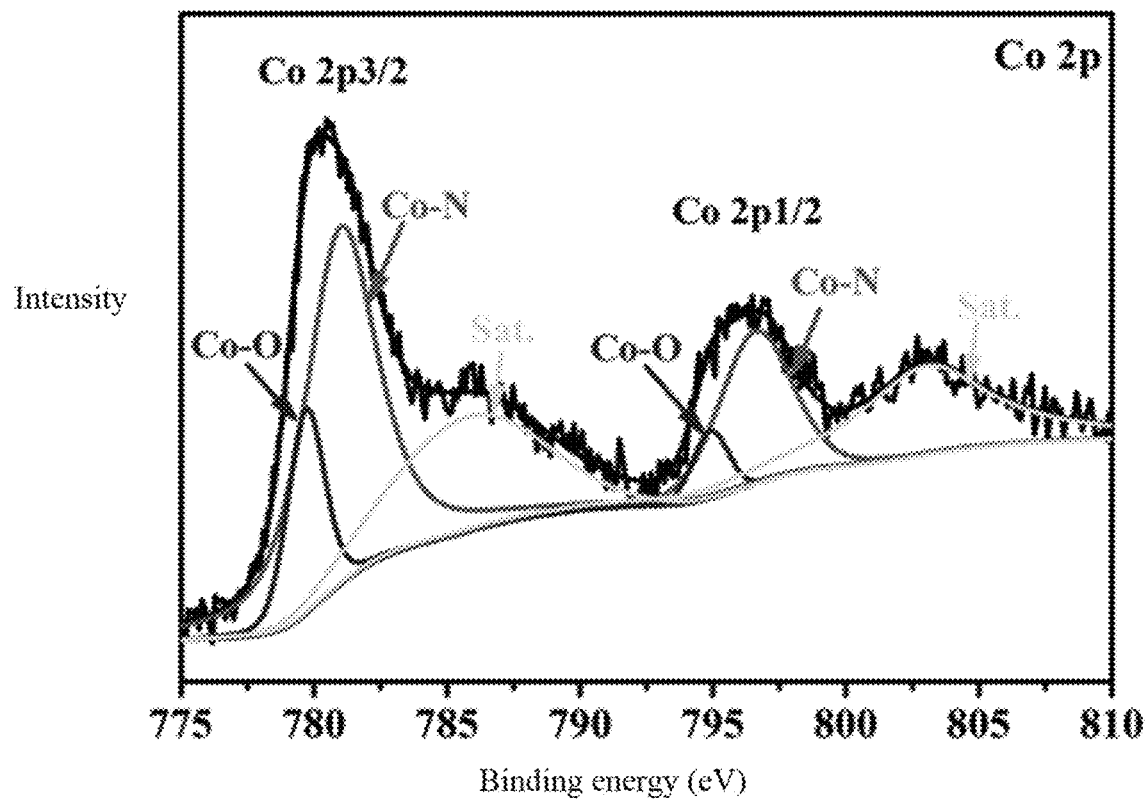
Figure 4C:
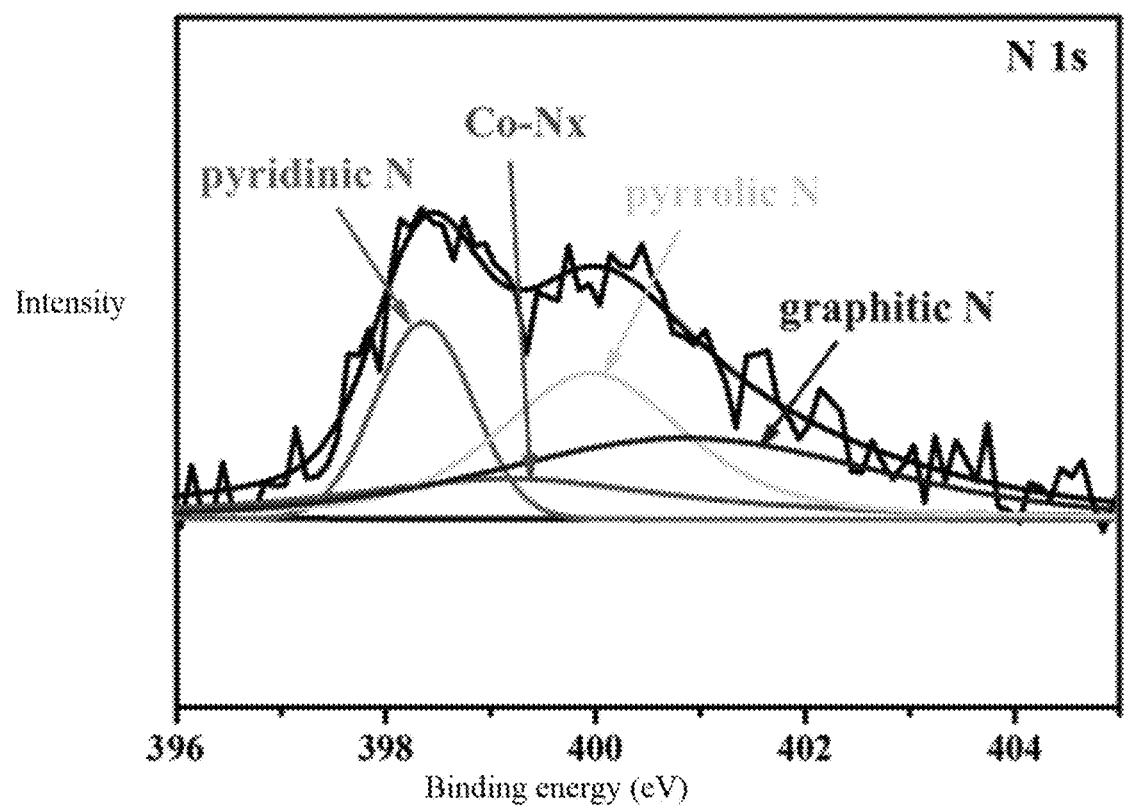
Figure 4D:
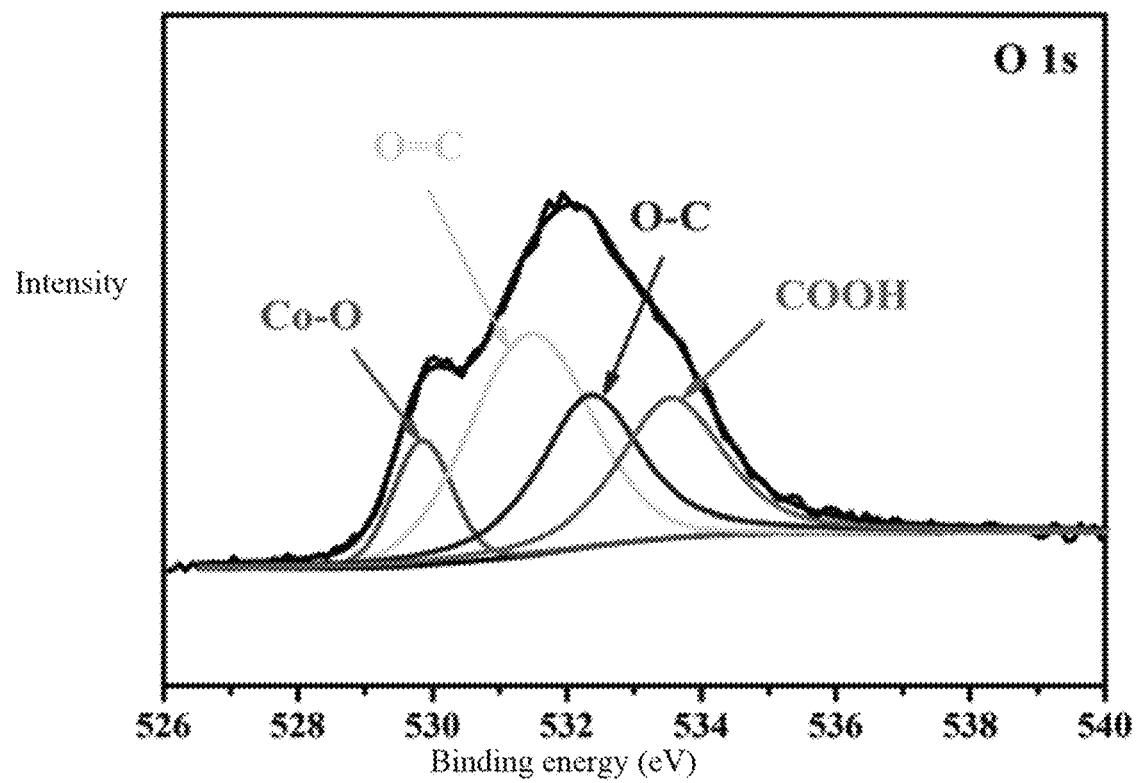

FIG. 4a is the XPS full spectrum of CoN—$CoO_x$/C-700, which shows that the elements C, N, O and Co are comprised. FIG. 4b is the Co 2p high-resolution spectrum, which shows that the element Co exists mainly in the forms of Co—N (81.0%) and Co—O (19.0%). FIG. 4c is the N1s high-resolution spectrum of the sample, in which Co—$N_x$ is 19.3% based on the total content of the element N. FIG. 4d is the O 1s high-resolution spectrum of the sample.

Performance Test on Electrocatalytic Oxygen Reduction and Zinc-Air Battery

A performance test on electrocatalytic oxygen reduction was performed using a three-electrode system; with CoN—$CoO_x$/C-700 loaded on a rotating disk glassy carbon electrode as a working electrode, a Pt electrode as a counter electrode, an Hg/HgO electrode as a reference electrode, and a 0.1 mol/L KOH aqueous solution as an electrolyte, an electrochemical test was performed.

Figure 5:
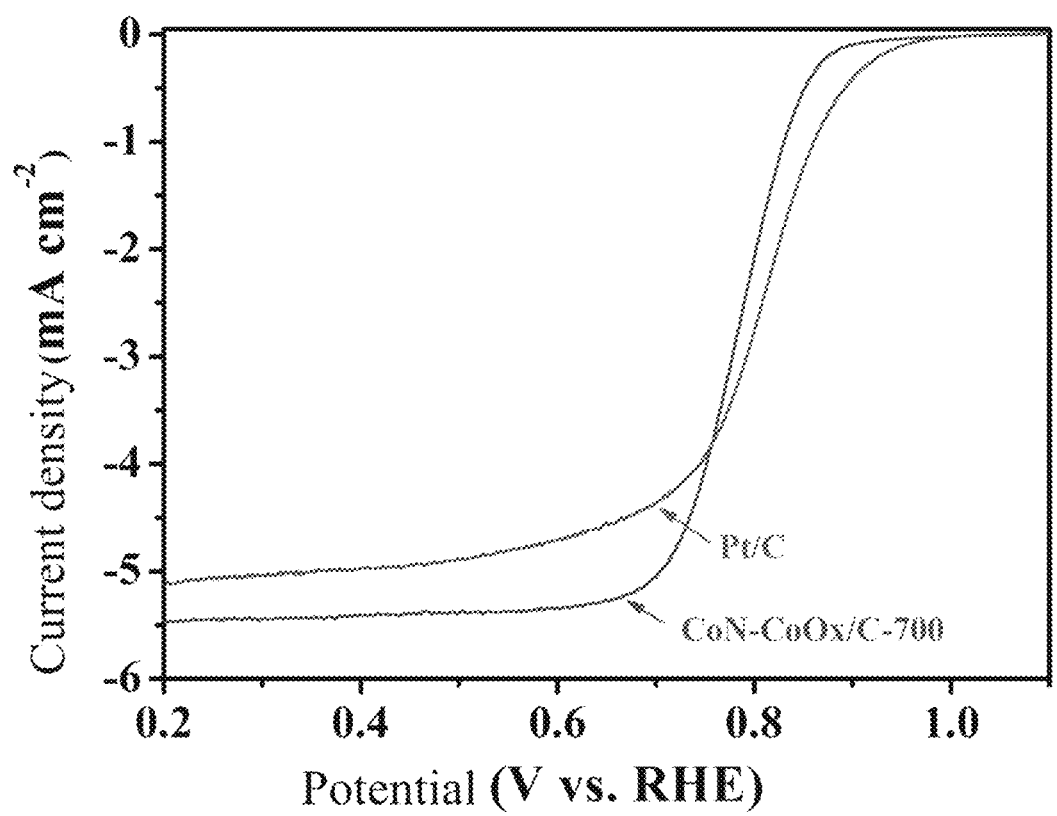
FIG. 5 shows the LSV curves of the CoN—$CoO_x$/C-700 prepared in example 1 and commercial Pt/C in a 0.1 mol $L^{-1}$ KOH electrolyte with $O_2$ saturation, at a scanning rate of 10 mV $s^{-1}$ and a rotation speed of 1,600 rpm.
Figure 6A:
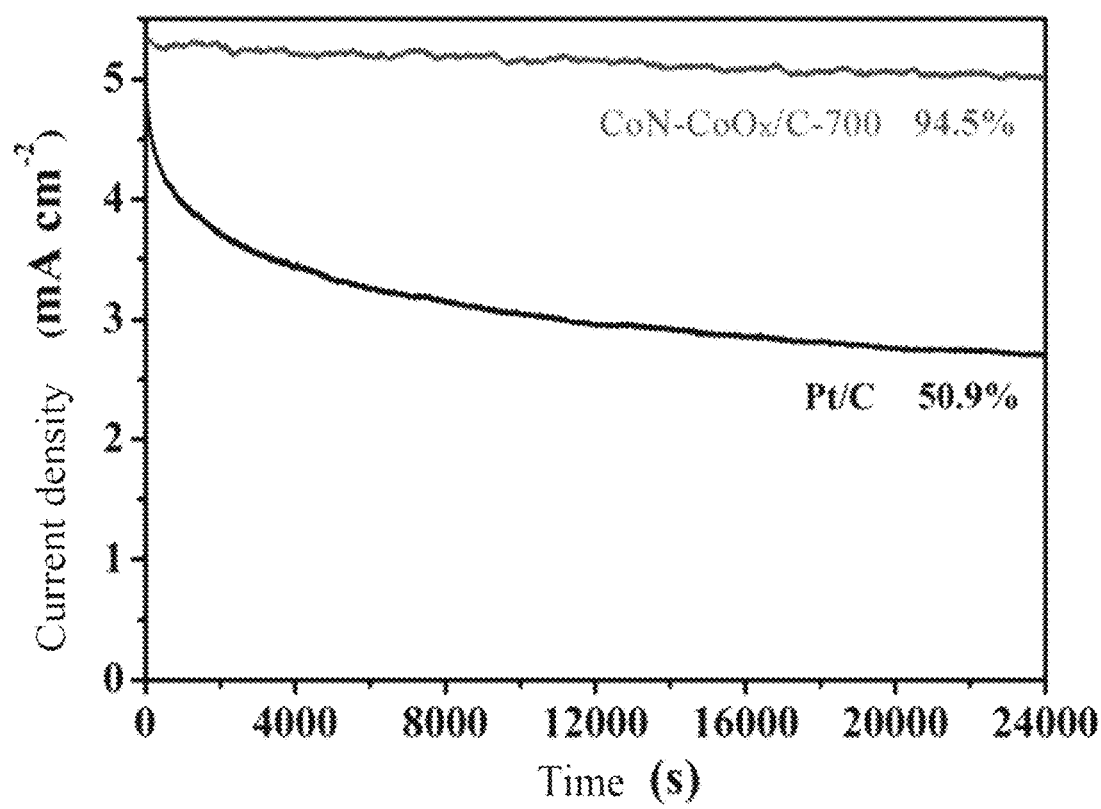
FIG. 6a and FIG. 6b show current-time curves of the CoN—$CoO_x$/C-700 prepared in example 1 and commercial Pt/C (FIG. 6a), and current-time curves with addition of methanol at 500-600 s (FIG. 6b).
Figure 6B:
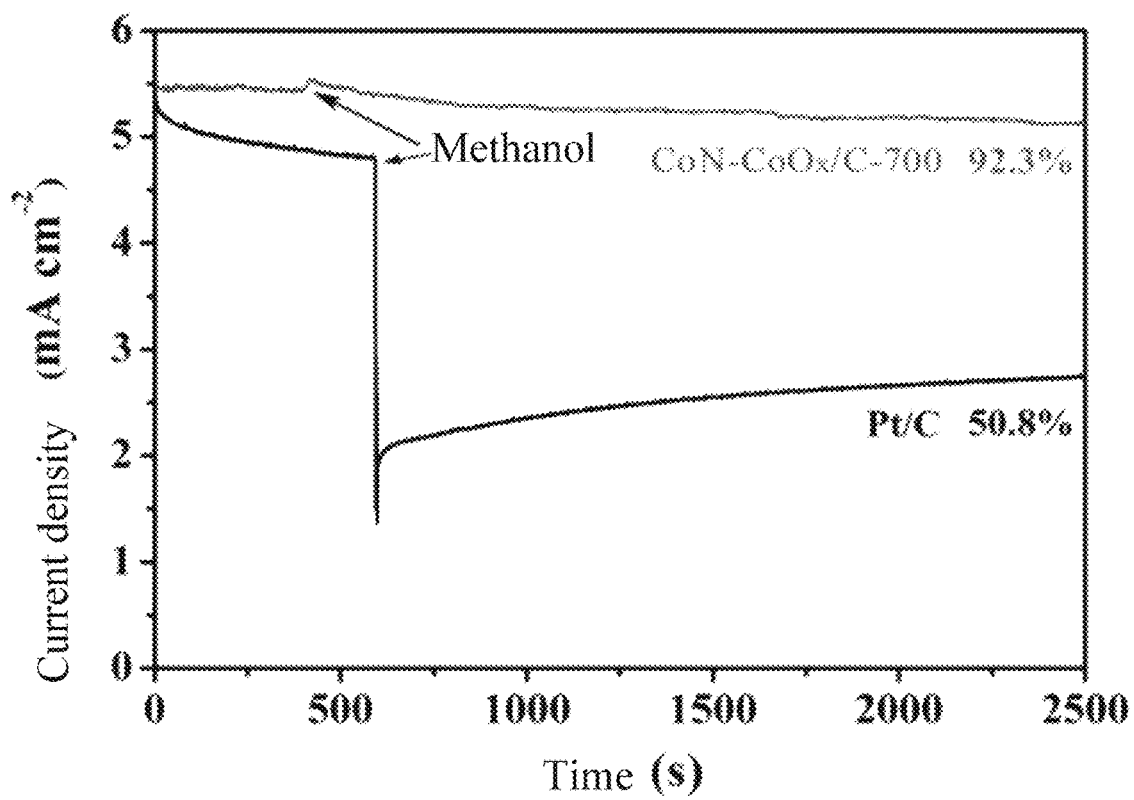

FIG. 5 shows the polarization curves (1,600 rpm) of the electrocatalytic oxygen reduction reactions of the CoN—$CoO_x$/C-700 prepared in this example and commercial Pt/C (20 wt %). It can be seen from FIG. 5 that the CoN—$CoO_x$/C-700 has a limiting current density of 5.47 mA/$cm^2$ which is higher than 5.12 mA/$cm^2$ of the commercial Pt/C, as well as an onset potential of 0.90 V vs. RHE and a half-wave potential of 0.79 V vs. RHE, which are both close to those of the commercial Pt/C (0.95 V vs. RHE and 0.80 V vs. RHE respectively). More importantly, the CoN—$CoO_x$/C-700 has higher stability (FIG. 6a) and methanol tolerance than the commercial Pt/C (FIG. 6b) and is very likely to become an alternative material for a Pt/C catalyst.

Figure 7A:
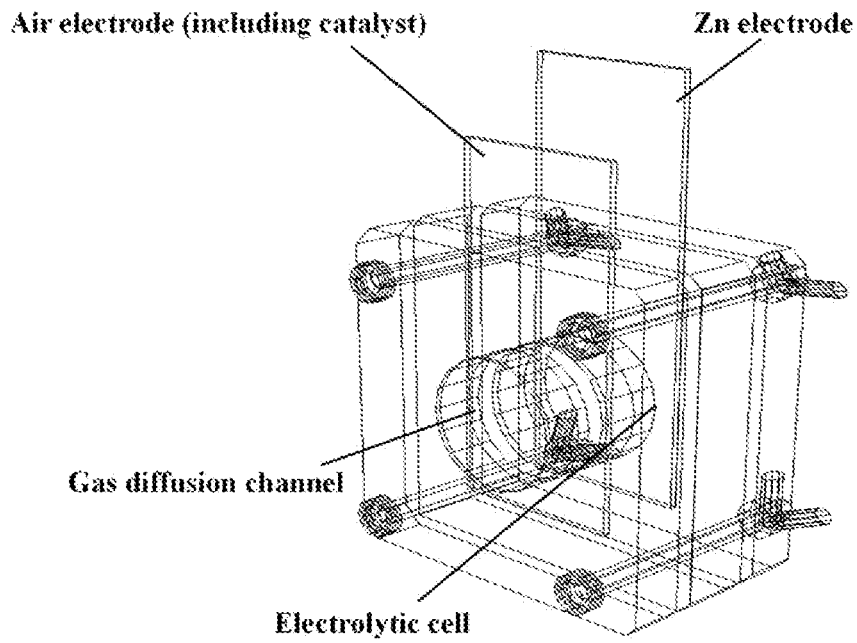
FIG. 7a, FIG. 7b, FIG. 7c, FIG. 7d, FIG. 7e, and FIG. 7f show a test device (FIG. 7a) for the zinc-air battery assembled in example 1, as well as discharge polarization curves of the zinc-air batteries taking CoN—$CoO_x$/C-700 and commercial Pt/C as a cathode catalyst respectively, and corresponding power density (FIG. 7b), open circuit voltage-time curves (FIG. 7c), constant current discharge curves at 10 mA $cm^{-2}$ (FIG. 7d), specific capacities (standardized into the mass of the consumed Zn) (FIG. 7e), and discharge curves at different current densities (FIG. 7f).
Figure 7B:
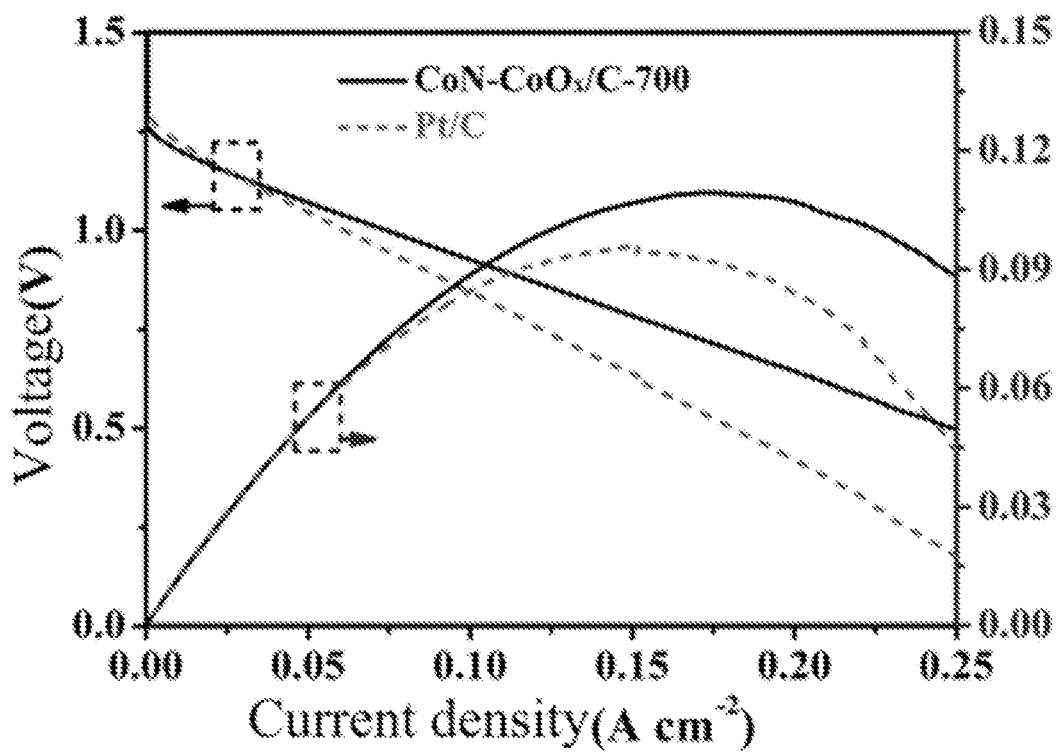

In order to evaluate the application prospect of the CoN—$CoO_x$/C-700 in metal-air batteries, the CoN—$CoO_x$/C-700 catalyst was loaded in mixture with acetylene black and a Nafion solution on a piece of hydrophobic carbon paper (with a loading capacity of 1 mg $cm^{-2}$) to serve as a cathode for assembling a zinc-air battery (FIG. 7a), and a performance test was performed. In addition, the commercial Pt/C was used as a cathode catalyst, and a zinc-air battery was assembled with the same method for comparison. FIG. 7b shows the polarization and power density curves of the zinc-air battery based on the CoN—$CoO_x$/C-700 air electrode (hereinafter referred to as CoN—$CoO_x$/C-700 battery).

Figure 7C:
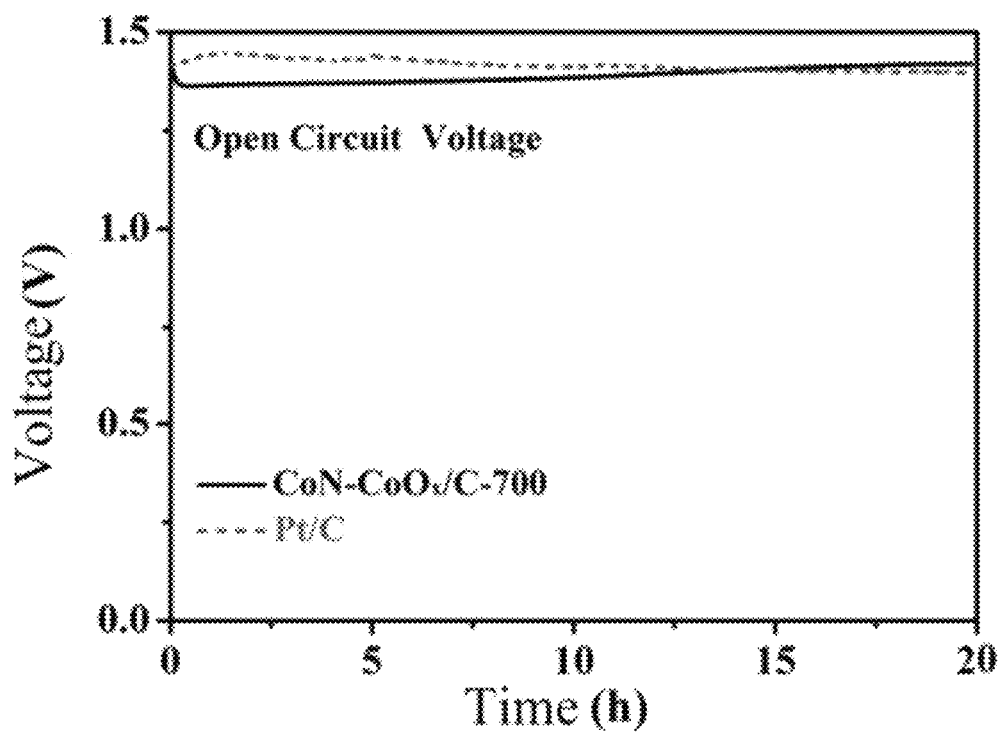
Figure 7D:
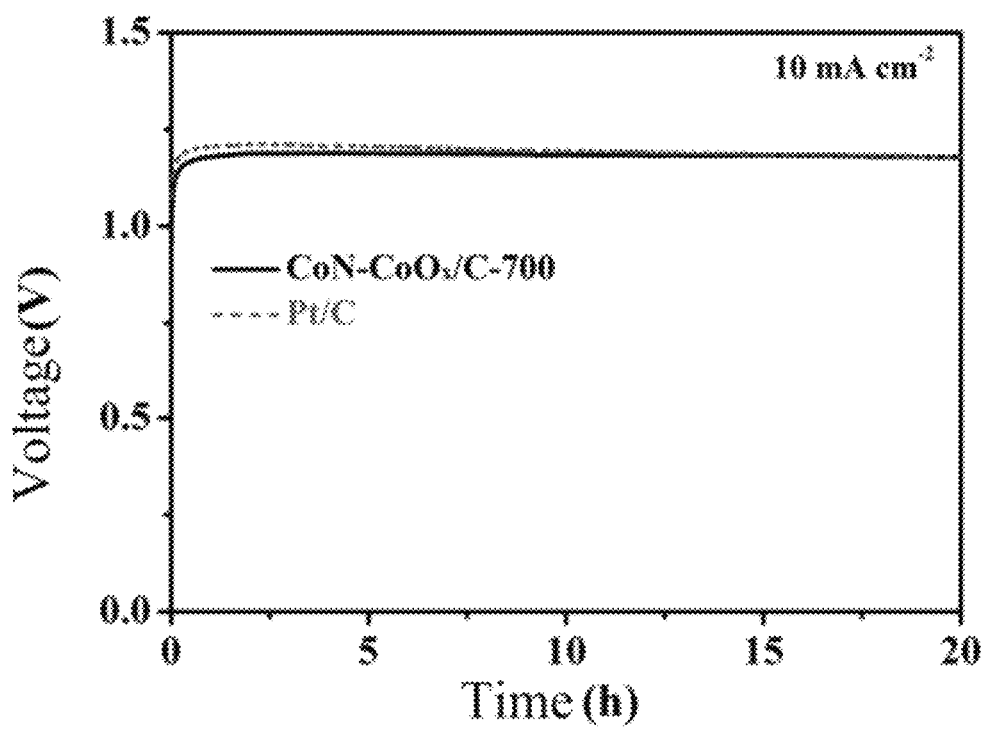
Figure 7E:
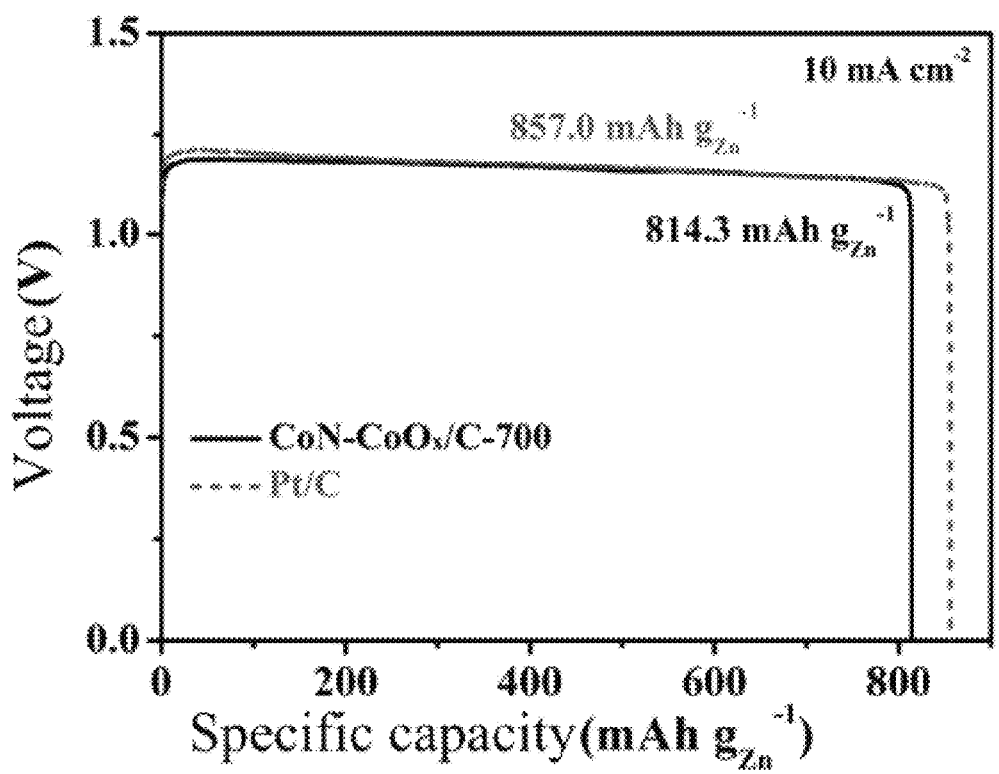
Figure 7F:
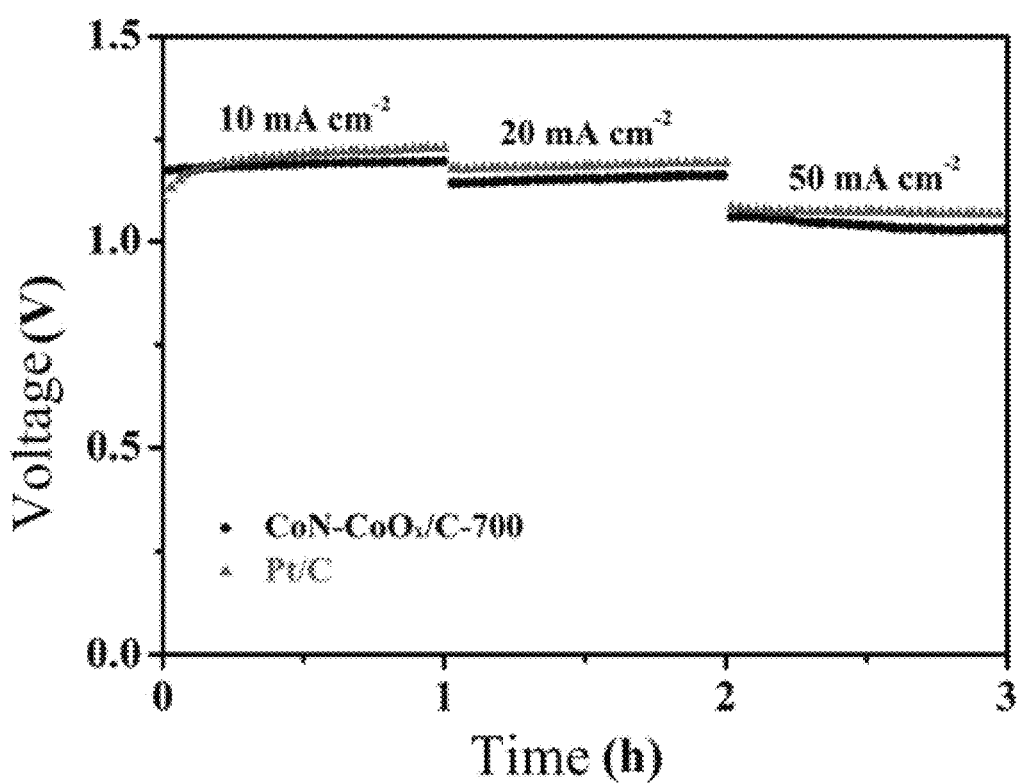

The CoN—$CoO_x$/C-700 battery has a peak power density of 109 mW $cm^{-2}$, which is better than that (96 mW $cm^{-2}$) of a commercial Pt/C battery. FIG. 7c is a curve chart of the relationship between open-circuit voltage and time, which shows that the open-circuit voltage of the CoN—$CoO_x$/C-700 battery increases gradually with the time and is stabilized at 1.419 V which is equivalent to that of Pt/C after 20 h. It can be seen from FIG. 7d that the voltage (1.15 V) of the CoN—$CoO_x$/C-700 battery after running for 20 h at a current density of 10 mA $cm^{-2}$ is also greater than that (1.13 V) of the commercial Pt/C battery. As shown in FIG. 7e, at the current density of 10 mA $cm^{-2}$, the specific capacity of the CoN—$CoO_x$/C-700 battery is 814.3 mAh $g_{Zn}^{-1}$, and corresponding energy density is 950.3 Wh $kg_{Zn}^{-1}$, which are slightly lower than those of the Pt/C (857.0 mAh $g_{Zn}^{-1}$ and 1,003.5 Wh $kg_{Zn}^{-1}$ respectively). It can be seen from FIG. 7f that at the discharge current densities of 10 mA $cm^{-2}$, 20 mA $cm^{-2}$ and 50 mA $cm^{-2}$, the batteries with air cathodes of CoN—$CoO_x$/C-700 and Pt/C all show a smooth discharge voltage, and the discharge voltage decreases with the increasing current density. The voltage plateaus of the CoN—$CoO_x$/C-700 battery at 10 mA $cm^{-2}$, 20 mA $cm^{-2}$ and 50 mA $cm^{-2}$ are 1.19 V, 1.15 V and 1.04 V respectively, indicating a smooth voltage change similar to that of the Pt/C catalyst.

Example 2

Preparation and Test of a CoN—$CoO_x$/C Composite (1) Mesoporous carbon is processed by surface functionalization the same as example 1.

(2) co-adsorption of metal ions $Co^{2+}$ and metal ammonia complex ions $Co(NH_3)_6^{2+}$ on mesoporous carbon: the same as example 1.

(3) heat treatment to obtain a CoN—$CoO_x$/C composite: the $Co(NH_3)_6^{2+}$&$Co^{2+}$/C sample was heated from room temperature to 800° C. at a heating rate of 1° C. $min^{-1}$ in $N_2$ atmosphere, and was held at the temperature for 1 h, to obtain a sample of high-performance cathode catalyst for a metal-air battery, marked as CoN—$CoO_x$/C-800.

Figure 8:
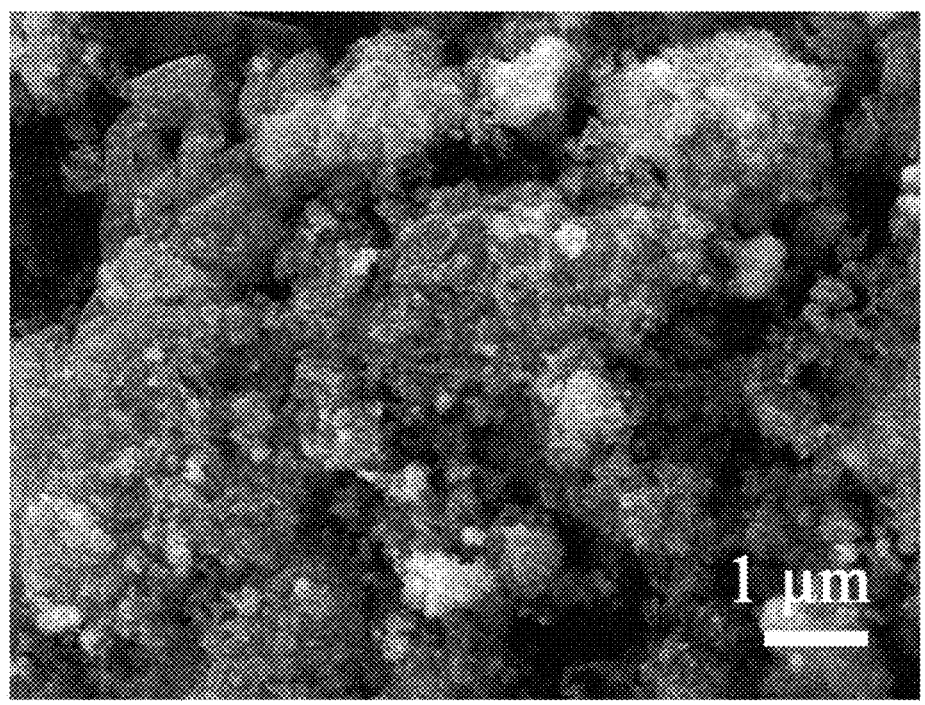
FIG. 8 is a field emission scanning electron micrograph of CoN—$CoO_x$/C-800 in example 2.

The SEM image of the obtained sample is shown in FIG. 8 which shows that when the calcination temperature is increased to 800° C., the orderly structure of CMK-3 mesoporous carbon is damaged and changed into an unordered porous structure.

Figure 9:
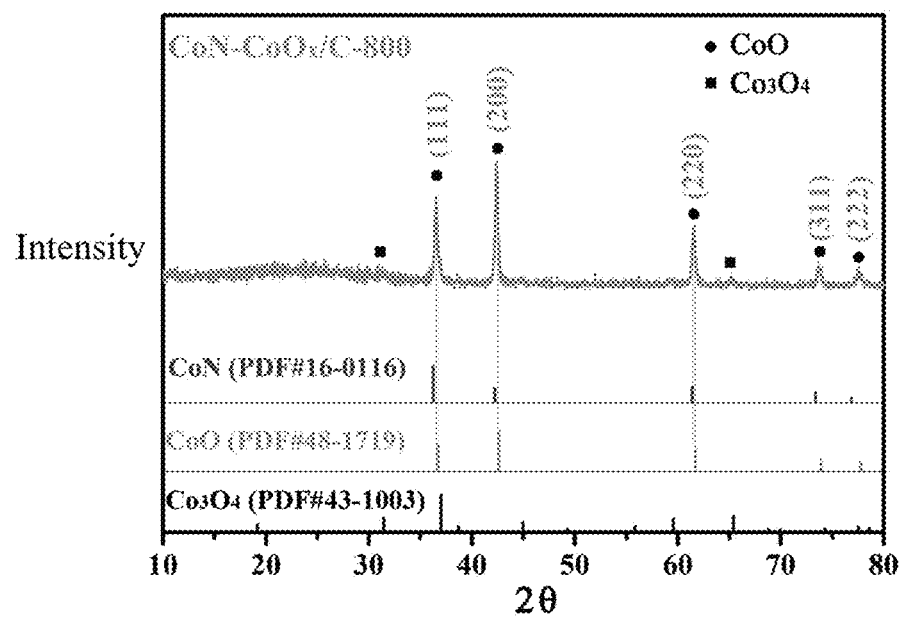
FIG. 9 is the XRD spectrum of CoN—$CoO_x$/C-800 in example 2.

FIG. 9 is the XRD spectrum of the sample, which shows that compared to the CoN—CoO$_x$/C-700, most of CoN in the CoN—CoO$_x$/C-800 from calcination at 800° C. is converted into CoO.

Figure 10:
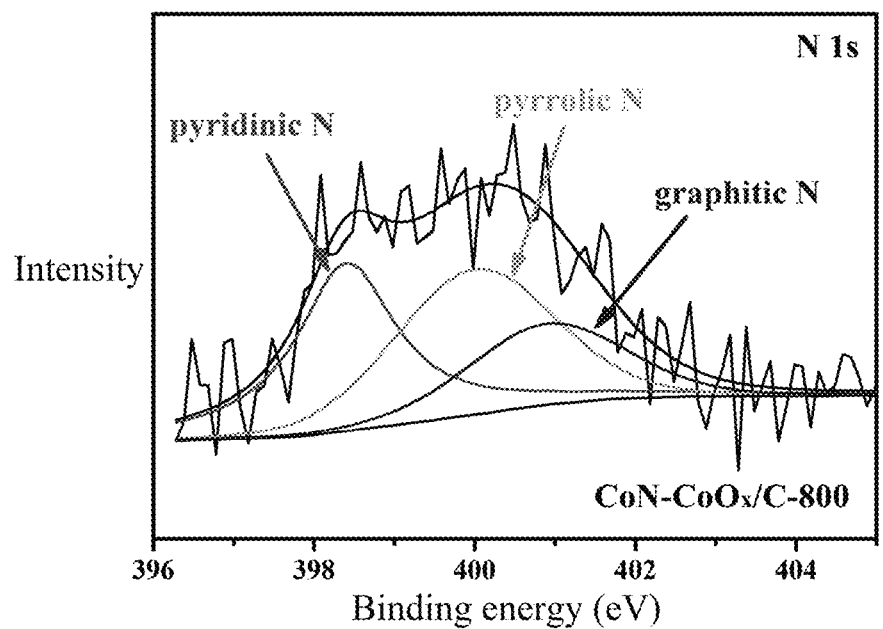
FIG. 10 is the N 1s high-resolution XPS spectrum of CoN—$CoO_x$/C-800 in example 2.

It can be seen from FIG. 10 that compared to the CoN—CoO$_x$/C-700, a Co—N$_x$ signal in the N is high-resolution spectrum of the CoN—CoO$_x$/C-800 disappears, further indicating that the CoN is converted into CoO.

Figure 11:
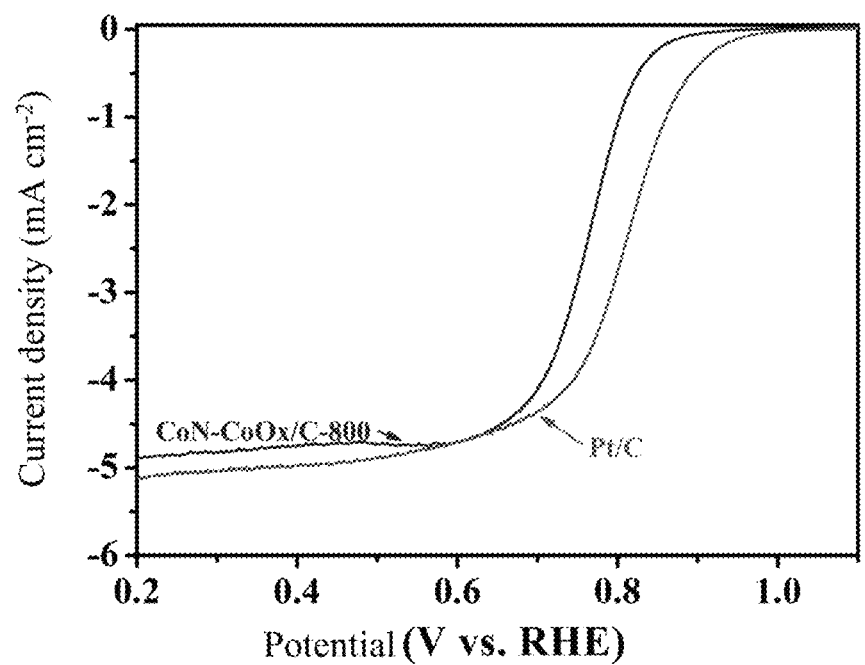
FIG. 11 shows the LSV curves of the CoN—$CoO_x$/C-800 prepared in example 2 and commercial Pt/C in a 0.1 mol $L^{-1}$ KOH electrolyte with $O_2$ saturation, at a scanning rate of 10 mV $s^{-1}$ and a rotation speed of 1,600 rpm.

FIG. 11 shows the polarization curves (1,600 rpm) of the electrocatalytic oxygen reduction reactions of the CoN—CoO$_x$/C-800 and the commercial Pt/C, which show that the CoN—CoO$_x$/C-800 has a limiting current density of 4.89 mA/cm$^2$, an onset potential of 0.87 V vs. RHE, and a half-wave potential of 0.76 V vs. RHE.

Example 3

Preparation and Test of a CoN—CoO$_x$/C Composite:
(1) Mesoporous carbon is processed by surface functionalization the same as example 1.
(2) co-adsorption of metal ions Co$^{2+}$ and metal ammonia complex ions Co(NH$_3$)$_6$$^{2+}$ on mesoporous carbon: the same as example 1.
(3) heat treatment to obtain a CoN—CoO$_x$/C composite: the Co(NH$_3$)$_6$$^{2+}$&Co$^{2+}$/C sample was heated from room temperature to 600° C. at a heating rate of 1° C. min$^{-1}$ in N$_2$ atmosphere, and was held at the temperature for 1 h, to obtain a sample of high-performance cathode catalyst for a metal-air battery, marked as CoN—CoO$_x$/C-600.

Figure 12:
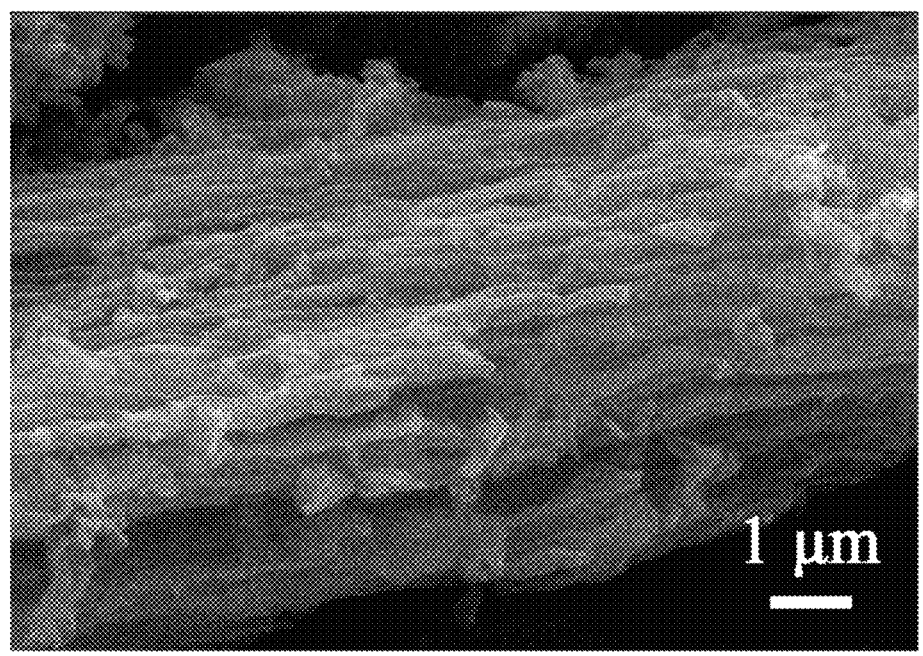
FIG. 12 is a field emission scanning electron micrograph of CoN—$CoO_x$/C-600 in example 3.

The SEM image of the obtained sample is shown in FIG. 12 which shows that when the calcination temperature is 600° C., the morphology of the mesoporous carbon is not damaged.

Figure 13:
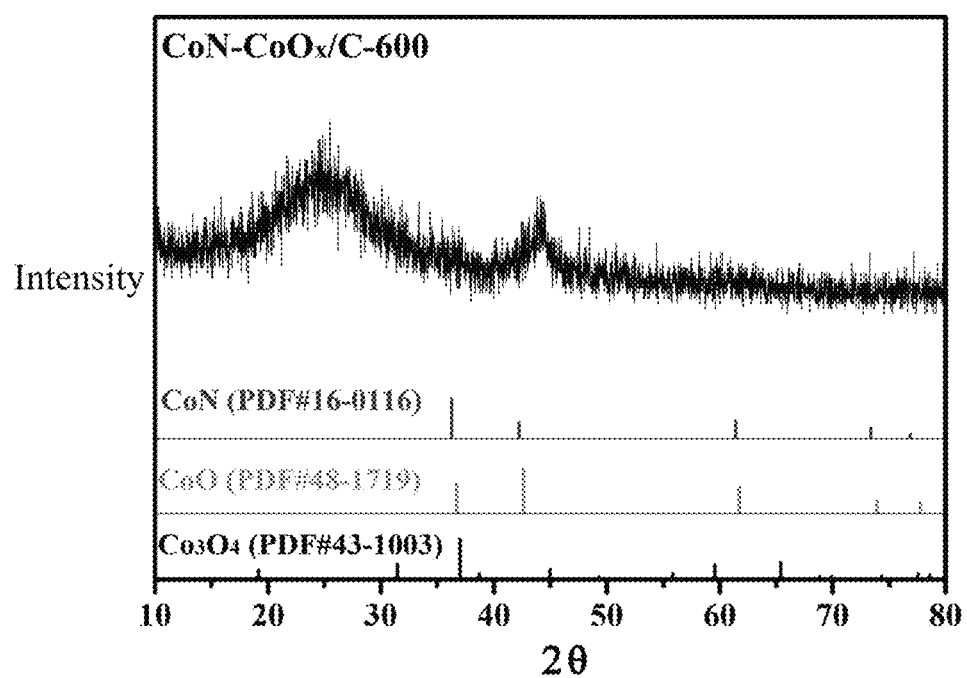
FIG. 13 is the XRD spectrum of CoN—$CoO_x$/C-600 in example 3.

FIG. 13 is the XRD spectrum of the sample, which shows that except two steamed bun peaks at around 24° and 44° (indicating the localized graphitized components of the mesoporous carbon), no diffraction peak appears at other positions, indicating that the adsorbed cobalt ions are not crystallized at this temperature.

Figure 14:
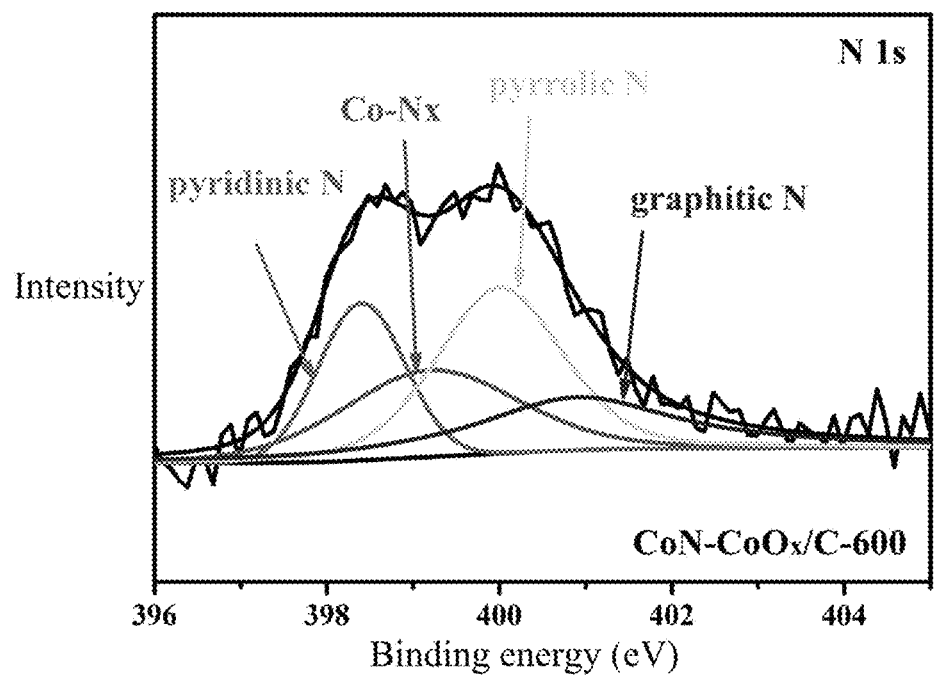
FIG. 14 is the N 1s high-resolution XPS spectrum of CoN—$CoO_x$/C-600 in example 3.

FIG. 14 is the N 1s high-resolution XPS spectrum of the CoN—CoO$_x$/C-600 sample, where a Co—N$_x$ signal comes from the calcination product of the Co(NH$_3$)$_6$$^{2+}$ complex ions.

Figure 15:
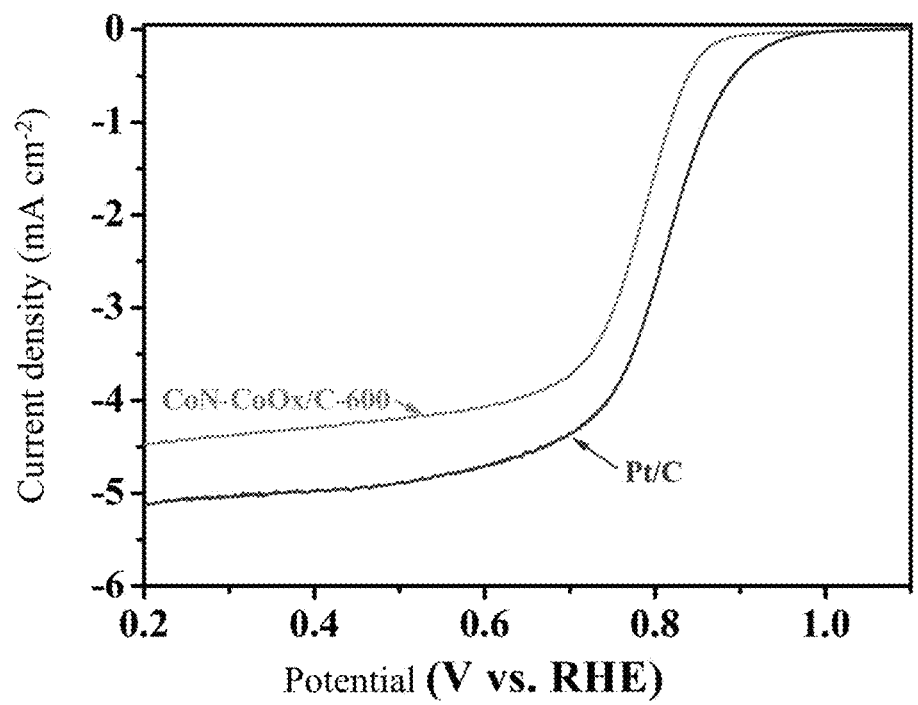
FIG. 15 shows the LSV curves of the CoN—$CoO_x$/C-600 prepared in example 3 and commercial Pt/C in a 0.1 M KOH electrolyte with $O_2$ saturation, at a scanning rate of 10 mV $s^{-1}$ and a rotation speed of 1,600 rpm.

FIG. 15 shows the polarization curves (1,600 rpm) of the electrocatalytic oxygen reduction reactions of the CoN—CoO$_x$/C-600 and the commercial Pt/C. It can be seen from the figure that the CoN—CoO$_x$/C-600 has a limiting current density of 4.48 mA/cm$^2$, an onset potential of 0.88 V vs. RHE, and a half-wave potential of 0.78 V vs. RHE.

Example 4

Preparation and Test of a CoO$_x$/C Composite.
(1) Mesoporous carbon is processed by surface functionalization the same as example 1.
(2) adsorption of metal ions Co$^{2+}$ on the mesoporous carbon: first, 50 mg of the surface-functionalized mesoporous carbon was soaked in 20 mL of a 3 mmol L$^{-1}$ CoCl$_2$ aqueous solution, and stirred for 1 h at room temperature; the treated mesoporous carbon was centrifugally washed three times using deionized water and absolute ethanol respectively; and finally, the sample was dried in vacuum for 12 h at 60° C., to obtain a Co$^{2+}$/C sample (without treatment with ammonia water, the obtained mesoporous carbon is only adsorbed with M$^{n+}$).
(3) heat treatment to obtain a CoO$_x$/C composite: the Co$^{2+}$/C sample was heated from room temperature to 700° C. at a heating rate of 1° C. min$^{-1}$ in N$_2$ atmosphere, and was held at the temperature for 1 h, to obtain a sample of cathode catalyst for a metal-air battery, marked as CoO$_x$/C-700.

Figure 16:
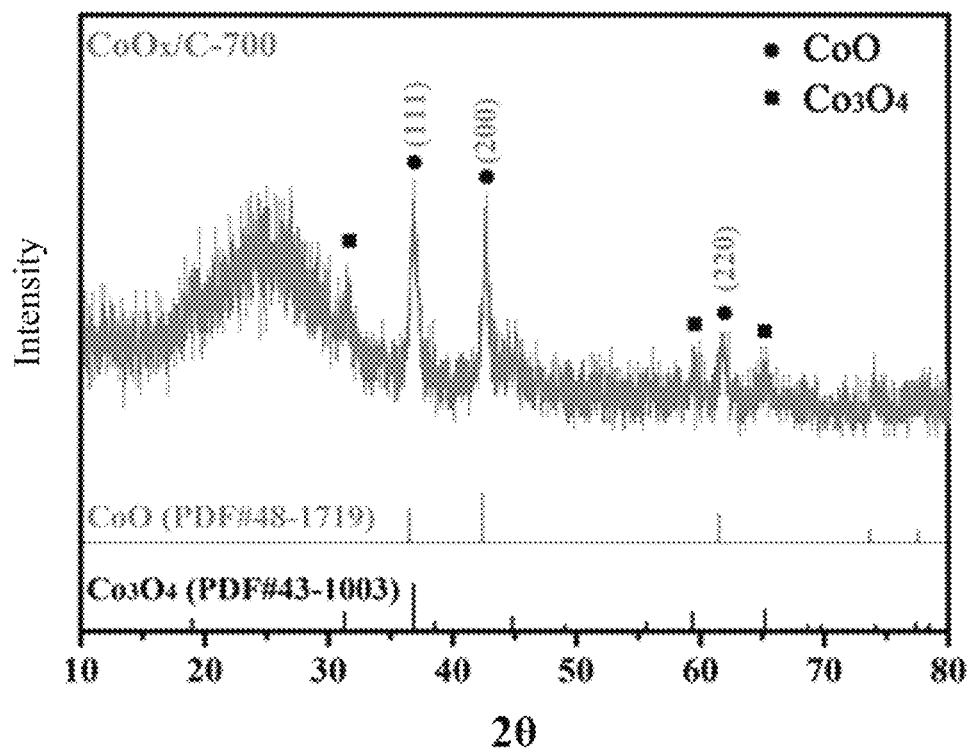
FIG. 16 is the XRD spectrum of the $CoO_x$/C-700 prepared in example 4.

FIG. 16 is the XRD spectrum of the CoO$_x$/C-700 sample, which shows that the cobalt ions are converted into Co$_3$O$_4$ and CoO at 700° C.

Figure 17:
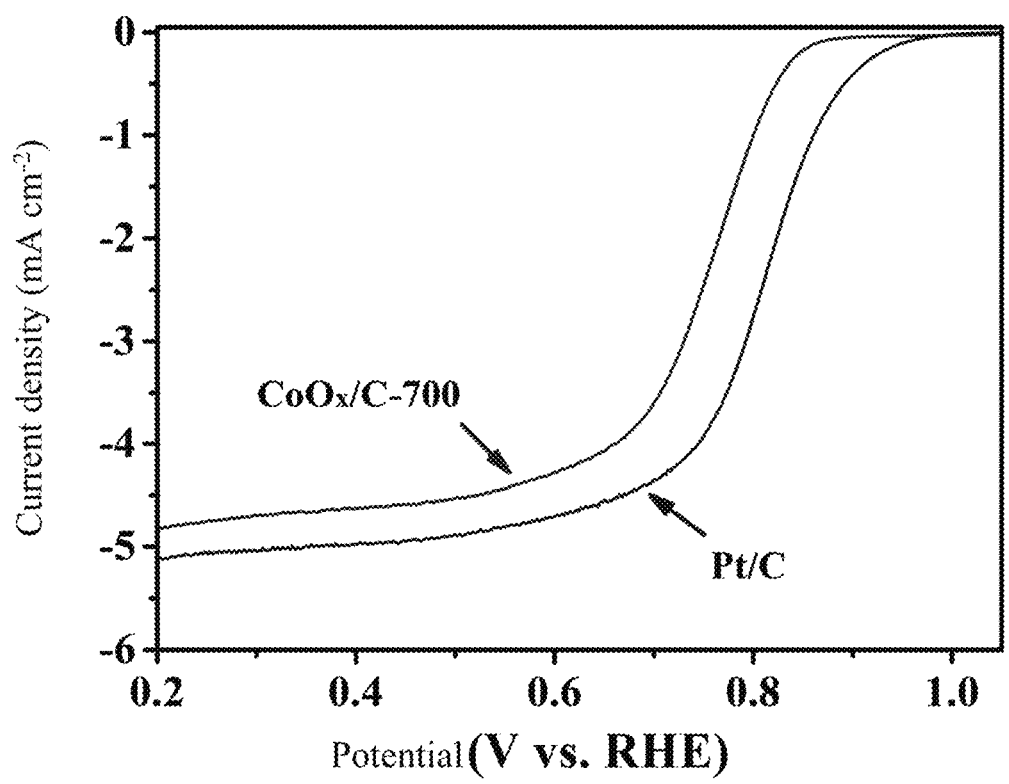
FIG. 17 shows the LSV curves of the $CoO_x$/C-700 prepared in example 4 and commercial Pt/C in a 0.1 M KOH electrolyte with $O_2$ saturation, at a scanning rate of 10 mV $s^{-1}$ and a rotation speed of 1,600 rpm.

FIG. 17 shows the polarization curves (1,600 rpm) of the electrocatalytic oxygen reduction reactions of the CoO$_x$/C-700 and the commercial Pt/C. It can be seen from the figure that the CoO$_x$/C-700 has a limiting current density of 4.48 mA/cm$^2$, an onset potential of 0.88 V vs. RHE, and a half-wave potential of 0.78 V vs. RHE.

Example 5

Preparation of a NiN$_x$—NiO$_y$/C Composite.
(1) Surface functionalization on mesoporous carbon: 80 mg of mesoporous carbon (CMK-3) was dispersed in 15 mL of a 2 mol L$^{-1}$ aqueous solution of nitric acid, and stirred for 0.5 h at room temperature; the dispersion was transferred into a 25 mL reaction kettle having a Teflon lining, and held at 100° C. for 6 h; the dispersion was cooled to room temperature, and then the kettle was opened; the sample of mesoporous carbon was centrifugally separated out and centrifugally washed three times using deionized water and absolute ethanol respectively; and finally, the sample was dried in vacuum for 24 h at 40° C., to obtain surface-functionalized mesoporous carbon.
(2) Co-adsorption of metal ions Ni$^{2+}$ and metal ammonia complex ions Ni(NH$_3$)$_6$$^{2+}$ on the mesoporous carbon: first, 50 mg of the surface-functionalized mesoporous carbon was soaked in 20 mL of a 1 mmol L$^{-1}$ NiCl$_2$ aqueous solution, and stirred for 0.5 h at room temperature; the thus-treated mesoporous carbon was centrifugally washed using deionized water, and then dispersed again in 30 mL of deionized water; after that, 10 mL of ammonia water (25-28%) was added, and stirred for 2 h at room temperature; the treated mesoporous carbon was centrifugally washed three times using deionized water and absolute ethanol respectively; and finally, the sample was dried in vacuum for 6 h at 90° C., to obtain Ni(NH$_3$)$_6$$^{2+}$&Ni$^{2+}$/C.
(3) Heat treatment to obtain a NiN$_x$—NiO$_y$/C composite: the Ni(NH$_3$)$_6$$^{2+}$&Ni$^{2+}$/C sample was heated from room temperature to 700° C. at a heating rate of 0.5° C. min$^{-1}$ in N$_2$ atmosphere, and was held at the temperature for 2 h, to obtain a sample of high-performance cathode catalyst for a metal-air battery, marked as NiN$_x$—NiO$_y$/C-700.

For the NiN$_x$—NiO$_y$/C-700 obtained from this example, the main phase components of the heterogeneous particles dispersed on carbon matrix are NiN, Ni$_3$N and NiO. The NiN$_x$—NiO$_y$/C-700 has ordinary electrocatalytic performance on an oxygen reduction reaction, with a limiting current density of 3.98 mA/cm$^2$, an onset potential of 0.84 V vs. RHE, and a half-wave potential of 0.73 V vs. RHE.

Example 6

Preparation of a CuN$_x$—CuO$_y$/C Composite
(1) Mesoporous carbon is processed by surface functionalization: 80 mg of mesoporous carbon (CMK-3) was dispersed in 15 mL of a 0.5 mol L$^{-1}$ aqueous solution of nitric acid, and stirred for 2 h at room temperature; the dispersion was transferred into a 25 mL reaction kettle having a Teflon lining, and held at 200° C. for 2 h; the dispersion was cooled to room temperature, and then the kettle was opened; the sample of mesoporous carbon was centrifugally separated out and centrifugally washed three times using deionized water and absolute ethanol respectively; and finally, the sample was dried in vacuum for 6 h at 90° C., to obtain surface-functionalized mesoporous carbon.

(2) Co-adsorption of metal ions $Cu^{2+}$ and metal ammonia complex ions $Cu(NH_3)_6^{2+}$ on the mesoporous carbon: first, 50 mg of the surface-functionalized mesoporous carbon was soaked in 20 mL of a 10 mmol $L^{-1}$ $CuCl_2$ aqueous solution, and stirred for 4 h at room temperature; the thus-treated mesoporous carbon was centrifugally washed using deionized water, and then dispersed again in 30 mL of deionized water; after that, 10 mL of ammonia water (25-28%) was added, and stirred for 0.5 h at room temperature; the treated mesoporous carbon was centrifugally washed three times using deionized water and absolute ethanol respectively; and finally, the sample was dried in vacuum for 24 h at 40° C., to obtain $Cu(NH_3)_6^{2+}$&$Cu^{2+}$/C.

(3) Heat treatment to obtain a $CuN_x$—$CuO_y$/C composite: the $Cu(NH_3)_6^{2+}$&$Cu^{2+}$/C sample was heated from room temperature to 700° C. at a heating rate of 10° C. $min^{-1}$ in $N_2$ atmosphere, and was held at the temperature for 4 h, to obtain a sample of high-performance cathode catalyst for a metal-air battery, marked as $CuN_x$—$CuO_y$/C-700.

For the $CuN_x$—$CuO_y$/C-700 obtained from this example, the main phase components of the heterogeneous particles dispersed on carbon matrix are $Cu_3N$, $Cu_2O$ and $CuO$. The $CuN_x$—$CuO_y$/C-700 has relatively low electrocatalytic performance on an oxygen reduction reaction, with a limiting current density of 2.75 mA/$cm^2$, an onset potential of 0.83 V vs. RHE, and a half-wave potential of 0.73 V vs. RHE.

The technical features of the above-mentioned examples can be combined in any way. For simple description, all possible combinations of various technical features in the above-mentioned examples are not described. However, as long as these combinations of the technical features do not have contradiction, they shall be considered to be within the scope of the description.

The basic principles and main features as well as the advantages of the present disclosure are shown and described above. Those skilled in the art should understand that the present disclosure is not limited to the above-mentioned examples; the above-mentioned examples and the description are only intended to describe the principles of the present disclosure; various changes and improvements to the present disclosure are possible without departing from the spirit and scope of the present disclosure; and these changes and improvements shall be included in the scope of the present disclosure. The scope of the present disclosure is defined by the attached claims and the equivalents thereof.

What is claimed is:

1. A preparation method of the high-performance positive electrode catalyst for a metal-air battery, wherein the catalyst is composed of transition metal nitride-transition metal oxide heterogeneous particles and a mesoporous-structure carbon matrix; the heterogeneous particles are dispersed in the mesoporous-structure carbon matrix in a form of nanoparticles; the heterogeneous particles have a size of 20-80 nm, and are 10-50% based on a total mass of the catalyst; the heterogeneous particles consist of a nitride of a transition metal and an oxide of the transition metal, wherein the oxide of the transition metal is 10 to less than 100% based on a total mass of the heterogeneous particles, and the preparation method comprising the following steps:

(1) surface functionalized processing on mesoporous carbon, wherein
the mesoporous carbon is dispersed in a strong acid solution, and stirred for 0.5 h to 2 h, so that the strong acid solution is fully immersed in a mesoporous structure of the mesoporous carbon to obtain a dispersion; the dispersion is put into a reaction kettle, held at 100-200° C. for 2 h to 6 h, and then naturally cooled to room temperature; the mesoporous carbon treated with the strong acid solution is centrifugally separated out and centrifugally washed using water and ethanol to obtain a resulting product, and the resulting product is dried in vacuum to obtain surface-functionalized mesoporous carbon; and (2) co-adsorption of transition metal ions $M^n$ and transition metal ammonia complex ions $M(NH_3)_m^{n+}$ on the mesoporous carbon, wherein
the surface-functionalized mesoporous carbon obtained in step (1) is immersed in an aqueous solution of a transition metal M salt having a concentration of 1-10 mmol and stirred for 0.5 h to 4 h so that the transition metal ions $M^{n+}$ are adsorbed on the mesoporous carbon; the mesoporous carbon adsorbing the transition metal ions $M^{n+}$ is centrifugally washed using water, and then dispersed in water again; after that, ammonia water having a concentration of 25%-28% is added, and stirred for 0.5 h to 2 h so that some of the transition metal ions $M^{n-}$ adsorbed on the mesoporous carbon contact the ammonia water and react to generate transition metal ammonia complex ions $M(NH_3)_m^{n+}$; then the mesoporous carbon contacted the ammonia water is centrifugally washed using water and ethanol respectively to obtain a resulting product; and the resulting product is dried in vacuum to obtain mesoporous carbon with $M^{n+}$ and $M(NH_3)_m^{n+}$ adsorbed thereon, namely, $M(NH_3)_m^{n+}$&$M^{n+}$/C; and (3) heat treatment on the mesoporous carbon with $M^{n+}$ and $M(NH_3)_m^{n+}$ adsorbed thereon to obtain a $MN_x$-$MO_y$/C composite, wherein
the $M(NH_3)_m^{n+}$&$M^{n-}$/C obtained in step (2) is calcined in an inert atmosphere or a vacuum condition, to obtain a composite having transition metal nitride-transition metal oxide heterogeneous particles highly dispersed in the mesoporous carbon matrix, namely, $MN_x$-$MO_y$/C.

2. The preparation method according to claim 1, wherein in step (1), the strong acid solution is a 0.5-2 mol $L^{-1}$ nitric acid solution.

3. The preparation method according to claim 1, wherein in steps (1) and (2), the temperature of the vacuum drying is 40-90° C., and the time is 6-24 h.

4. The preparation method according to claim 1, wherein in step (2), the transition metal salt is a chloride or nitrate of a transition metal.

5. The preparation method according to claim 1, wherein in step (3), the calcining method is: increasing the room temperature to 600-800° C. at a rate of 0.5-10° C./min, holding the temperature for 1 h to 4 h, and naturally cooling to the room temperature.

6. The preparation method according to claim 1, wherein in step (3), the inert atmosphere is $N_2$ atmosphere.

7. The preparation method according to claim 1, wherein in step (1), the concentration of the mesoporous carbon in the aqueous solution of nitric acid is 3-10 mg/mL.

8. The preparation method according to claim 1, wherein in step (2), a dosage ratio of the surface-functionalized mesoporous carbon, the aqueous solution of the transition metal salt and the ammonia water is 1-10 mg:1-5 mL:1 mL.

9. The preparation method according to claim 1, wherein the transition metal is Co, Ni or Cu.

* * * * *